Oct. 29, 1968 D. A. ROE 3,407,512
SELF-TEACHING DEVICE
Filed Dec. 7, 1965

INVENTOR
DONALD A. ROE
BY
Kane, Dalsimer & Kane
ATTORNEYS

United States Patent Office 3,407,512
Patented Oct. 29, 1968

3,407,512

SELF-TEACHING DEVICE

Donald A. Roe, Northport, N.Y., assignor to Educational Development Laboratories, Inc., Huntington, N.Y., a corporation of New York Filed Dec. 7, 1965, Ser. No. 512,150
3 Claims. (Cl. 35—8)

ABSTRACT OF THE DISCLOSURE

A method for instruction in the preparation of data processing cards in which the cards receive intelligence material that is predeterminedly arranged in such a manner that the original data which is transcribed, as both punches and symbols, in one half of the card is in the inverse order of that data transcribed in the other half of the card allowing for a rapid check of the transcription accuracy by registry or lack of registry of a code of punches when the card is folded about a central reference line.

The present invention generally relates to a method of instruction in punch card preparation whereby not only persons of limited or no experience but also persons having present familiarity with such operation may develop experience and/or increase their level of performance to attain a high degree of accuracy accompanied by an increase in speed. More specifically, the invention relates to a new and improved instruction method with a built-in "quick-check" feature enabling the operator to determine the accuracy of the data transcribed in the card, whether it be alphabetic data, numeric or special characters.

A basic operating unit in data processing is the punched card carrying original data in the form of punched holes that ultimately actuate various record keeping machines. Industry is now confronted with the immediate need for skilled operators to prepare the punched cards accurately from original processing data. Yet, instruction in punch card preparation is offered only on a limited basis by some schools. Obviously, these institutions are not capable of training and supplying sufficient personnel to meet present and future demands of industry. So the primary training responsibility has fallen on industry and will in all probability, continue to rest with industry.

It is an object of this invention to provide a new and improved method of instruction whereby an individual may become proficient in punch card preparation through training and the use of a built in "quick-check" feature that immediately indicates the number and type of errors made during a punching operation.

Other objects and advantages of this invention will rapidly become apparent during the course of the following description.

In a broad sense, the invention is directed to a new and improved method of instruction in the formation of perforations on a standard punch card used in a data processing system so that the various perforations in the card will represent intelligence data. The method comprises providing intelligence data for a punch card arranged so that when the data is properly transcribed in the form of perforations in the punch card, the perforations on one side of the card will be in exactly reverse relationship to the perforations on the other side. The operator then transcribes the data into perforations in the card and upon completion, he folds the card in half to check the accuracy thereof. If the transcription is accurate, then each of the perforations on one half will be in registration with a perforation on the other half. Any error is indicated by a failure of registration between perforations on the two halves.

In the accompanying drawing which forms a part of this application;

Operation of a card punch machine as well as the standard typewriter involves the close interaction of an individual's visual, mental and motor functions to distinguish intelligence data properly in one form and transcribe this intelligence generally to another form. In punch card operation, this obviously calls for the transcription of original data to a card with such data being represented by the formation of one or more properly positioned punches in a card. Simultaneously, printed indicia may be presented along the top surface of the card. In either situation the operator strives for both a rapid and accurate transcription.

It is well known that both rapid and accurate transcription of intelligence data by a punch card operator may be developed through unsupervised practice over a long period of time in addition to familiarity with the data to be transcribed. But proficiency is more likely to be developed through a carefully planned and conducted training procedure whereby a series of specially designed film strips are projected on a screen. Through the training procedure outlined below, an operator will develop his concentration, be motivated to feel a challenge to increase and attain a high level of speed and accuracy that will be carried over to actual operation.

The film strips to be projected may contain numeric, alphabetic and mixed numerical and alphabetic exercises, each of which is provided with the built in "quick-check" feature. As desired, the strips may be divided into several parts so that more than a single card may be punched in each particular exercise. Further, the number of digits per frame or words per frame may increase during a single lesson or throughout a group of lessons necessitating greater concentration and increasing the challenge for the operator. Further still, the original data may contain difficult fingering exercises likely to be encountered in actual practice.

The projector may be provided with a scanning plate so that original intelligence data is projected from left to right to simulate the movement of the punch card past the punch station as the various punches are produced. The scanning plate unmasks only a small portion of the lesson at a time and is paced for left to right movement, therefore, preventing the operator from looking backward or forward. This develops ability to concentrate on the material at hand.

Figure 1:
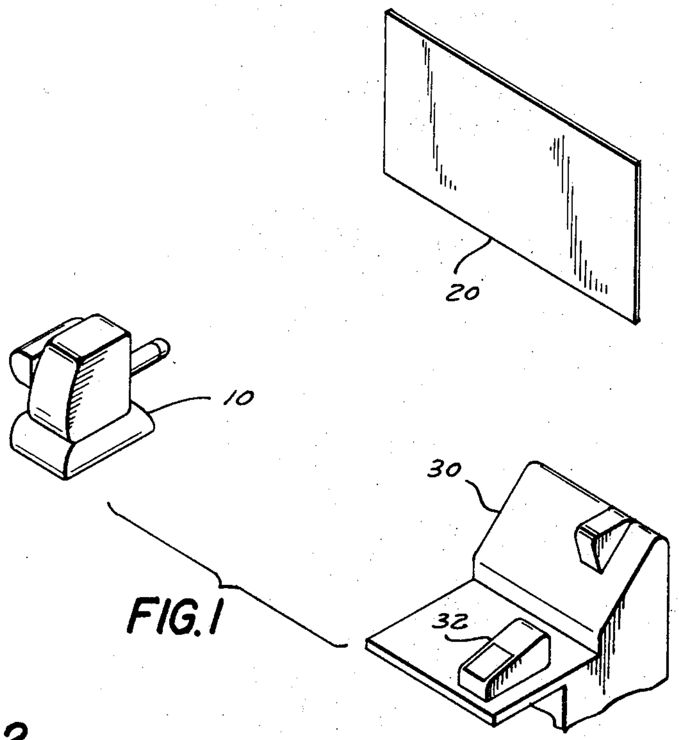
FIGURE 1 is an isometric presentation that shows the environment and the various component parts which may be used to carry out the invention.

FIG. 1 schematically shows the equipment which may be used in the present self-teach method, and attempts to illustrate how the aforementioned functions come into play.

The equipment comprises a projector 10, a screen 20 that is positioned in the light beam path of the projector and a card punch station 30, located in the field of view of the screen so the operator may react to given stimulus. One of the many commercially available card punch machines 32 is provided at the punch station.

Although the construction and operation of the card punch station and machine and the punch card per se are outside the scope of this invention, it is appropriate to present a few general thoughts on each.

The punching unit 30 generally comprises a card hopper, a feeding mechanism that feeds individual cards to a punching station whereby a series of punches as determined by the operation of the machine 32 are formed, a reading station and a card stacker. Specifics as to the operation of the hopper and feeding mechanism may be obtained by reference to Catalogue A24–0520–2, referring to IBM 24–26 as prepared by International Business Machines Corporation, Data Processing Division.

Generally, the machine 32 resembles a typewriter. It is provided with a keyboard (not shown) which may carry both numeric and alphabetic keys, together with keys representing special symbols. Specifics of the machine may also be obtained from the aforementioned catalogue.

The card generally indicated by the numeral 40, is shown in FIGS. 2–5 and represents what may be considered a standardized punch card. More specifically, the card contains the standard eighty columns that are positioned from left to right across the card, with each column providing twelve horizontal rows from top to bottom, ten of these rows being numbered, as for example, "0," "1" and "2" through "9" and denoted by the numeral 42. The remaining two rows not numbered, are provided above the "0" row and together with the zero row are used to present a zone code.

As previously mentioned, intelligence is reproduced in the card by means of a punched hole. The positioning of each hole or holes in respective columns represents a symbol, either numeric, alphabetic or a special character. Generally, the numerical symbol will be reproduced as a single punch in the particular column presently at the punch station and in the appropriate row, "0," "1," etc. The alphabetic symbol is reproduced by means of a zone code punch together with a single numeric punch. The complexities of the code for any type of symbol are beyond the scope of the present invention and all that one needs to know for the purpose of this description is that each symbol, whether it be numeric, alphabetic or a special character has a particular punch pattern corresponding therewith.

Figure 2:
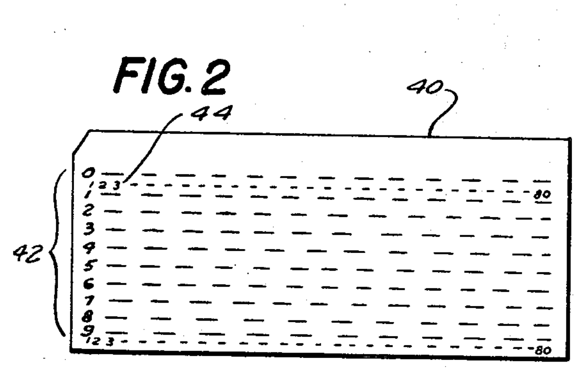
FIGURE 2 is a side view of one side of a punch card prior to any perforations being formed therein.
Figure 4:
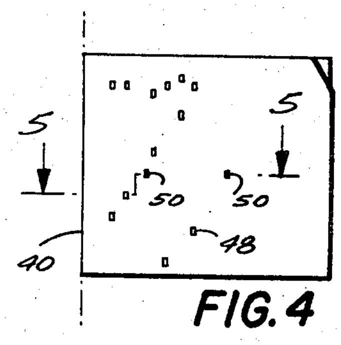
FIGURE 4 is a side view of the perforated punch card as shown in FIG. 3 with the card having been folded in half.

Referring now to FIGS. 2–5 the new and improved method of instruction is sequentially developed. In FIG. 2 a punch card containing standard indicia 42, representing the various horizontal rows and indicia 44, representing the eighty vertical columns is shown prior to any intelligence data having been punched therein or formed thereon. Such a card is placed in the hopper at the punch station to await subsequent removal to a punching location whereat the card is prepared by the operator in accordance with original data.

Figure 3:
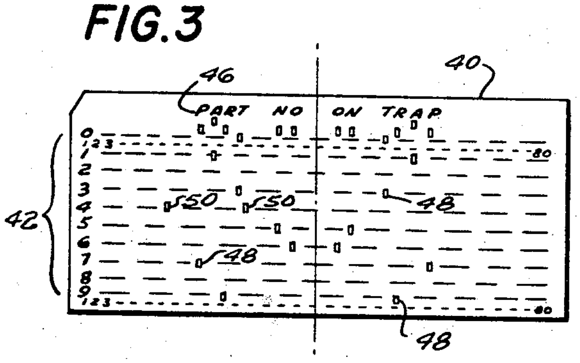
FIGURE 3 is a similar view of the side of the punch card of FIG. 2 after perforations and printed matter, representing intelligence data, have been formed therein.
Figure 5:
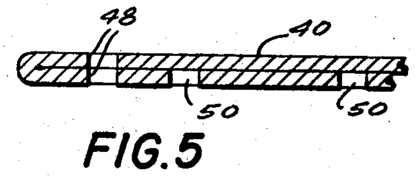
FIGURE 5 is a sectional view taken along the line 5—5 in FIG. 4 so as to show two correctly punched holes in registry and two incorrectly punched holes out of registry.

FIG. 3 shows the card of FIG. 2 with intelligence in the form of printed matter 46 across and adjacent the top periphery of the card together with a plurality of holes 48 formed within the body of the card and located in a position whereby the hole or holes in a single column represent the printed matter in that column. As is apparent from the figure, this printed matter ("Part No On Trap") and consequently the holes in the respective columns are arranged in one pattern on the left half of the card and in the reverse thereof on the right half of the card. It is this inverse relationship of punches in the respective halves that provides for the novel "quick-check" feature that forms the basis of this invention.

Therefore, when original data, arranged in a manner to provide the built in "quick-check" feature, is transcribed into a card, the plurality of properly punched holes 48 will be in registry when the card is folded (FIGS. 4 and 5) along a center line. With the card in the folded condition improperly punched holes, represented by the numeral 50, are also readily observed. Since it is highly unlikely that an operator will make identical mistakes in corresponding mirror-image columns, for practical purposes, any error in transcribing the original data into the card will be revealed as a lack of registry between the punched holes. Such improper punching may either represent a wrong key being struck or a failure to strike any key at all. This may be determined by comparing the printed matter 46 with the original data being transcribed.

From the foregoing description, it is apparent that the invention provides a new and improved method of instruction whereby persons may be trained in punch card operation and by a "quick-check" feature determine the accuracy of a data transcription.

While the invention has been particularly shown and described with reference to the preferred embodiment thereof, it will be understood by those skilled in the art that various changes in form and details may be made therein without departing from the spirit and scope of the invention.

Having described the invention what is claimed is:

1. The improved method of instruction in the accurate formation of perforations in a punch card used in a data processing system wherein the perforations in the card represent intelligence data which comprises: providing an elongated punch card with a transverse reference axis on which the card may be longitudinally folded, displaying indicia representing intelligence data arranged in two equal sequences and being the identical indicia arranged in the same spacing in both sequences with the indicia of the second sequence being arranged in inverse relationship to the indicia in the first sequence, then by means of a sequential operation forming a pattern of perforations representative of the displayed indicia in the elongated card body with the pattern on one side of the reference axis arranged in a sequence that is balanced and in equally spaced relationship with the pattern on opposite sides of the transverse reference axis, and finally folding the card on the transverse axis so that any error representing either an excess or inadequate amount of perforations will be indicated by a lack of registry of the formed perforations.

2. The improved method of instruction in the accurate formation of perforations in a punch card used in a data processing system wherein the perforations in the card represent intelligence data which comprises: providing an elongated punch card with a transverse reference axis along which the card may be longitudinally folded, recording a message in at least two codes on the card, one of which is in the form of perforations by means of a sequential operation provided in and throughout the card body, wherein individual code units forming a code group are sequentially provided from left to right in spaced groups across the card with each spaced group on one side of the reference axis represented by a group which is the equidistantly spaced mirror image on the other side of the reference axis, and folding the card on the transverse reference axis so that any error representing either an excess or inadequate coding of respective portions of the card will be determined.

3. The improved method of instruction in the accurate formation of perforations in a punch card used in a data processing system wherein the perforations in the card represent intelligence data which comprises: providing an elongated punch card with a transverse reference axis along which the card may be longitudinally folded, displaying written indicia representing intelligence data arranged in two equal sequences on opposite sides of said axis, each sequence containing identical indicia arranged in the same spacing in both sequences with the indicia of the sequences being arranged in inverse relationship to each other, simultaneously and in a sequential manner forming perforations representing the same written intelligence indicia in the elongated card with the two perforation sequences also arranged in balanced and equally spaced relationship on opposite sides of the transverse reference axis and each sequence also being in inverse relationship to the other, and finally folding the card on the transverse axis so that any error representing either an excess or inadequate amount of perforations will be indicated by a lack of registry of the formed perforations.

References Cited

UNITED STATES PATENTS

| | | | |
|---|---|---|---|
| 1,797,744 | 3/1931 | Wiley | 35—48.1 |
| 2,342,517 | 2/1944 | Nevin | 129—16.1 |
| 3,151,403 | 10/1964 | Sinex | 35—9 |

EUGENE R. CAPOZIO, *Primary Examiner.*

W. W. NIELSEN, *Assistant Examiner.*